(12) United States Patent
Jia

(10) Patent No.: US 8,343,236 B2
(45) Date of Patent: Jan. 1, 2013

(54) ANTI-THEFT SYSTEM AND METHOD FOR MOBILE PHONE

(75) Inventor: Li-Jin Jia, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 650 days.

(21) Appl. No.: 12/604,917

(22) Filed: Oct. 23, 2009

(65) Prior Publication Data

US 2010/0135492 A1 Jun. 3, 2010

(30) Foreign Application Priority Data

Dec. 3, 2008 (CN) .......................... 2008 1 0305937

(51) Int. Cl.
*G08B 13/00* (2006.01)
(52) U.S. Cl. ................ 726/35; 726/3; 380/247; 455/411
(58) Field of Classification Search .................... 726/35; 380/247; 455/411
See application file for complete search history.

(56) References Cited

U.S. PATENT DOCUMENTS

| | | | | |
|---|---|---|---|---|
| 5,742,910 A | * | 4/1998 | Gallant et al. ................ | 455/558 |
| 5,933,773 A | * | 8/1999 | Barvesten .................... | 455/411 |
| 6,005,942 A | * | 12/1999 | Chan et al. .................... | 713/187 |
| 6,223,291 B1 | * | 4/2001 | Puhl et al. ...................... | 726/28 |
| 7,227,952 B2 | * | 6/2007 | Qawami et al. ............... | 380/201 |
| 2006/0116169 A1 | * | 6/2006 | Park ............................. | 455/558 |
| 2007/0011466 A1 | * | 1/2007 | Imura ........................... | 713/186 |
| 2008/0173708 A1 | * | 7/2008 | Bonalle et al. ................ | 235/380 |
| 2008/0285755 A1 | * | 11/2008 | Camus et al. ................ | 380/270 |
| 2009/0011739 A1 | * | 1/2009 | Cofta ............................ | 455/411 |
| 2009/0253410 A1 | * | 10/2009 | Fitzgerald et al. ............ | 455/411 |
| 2009/0273435 A1 | * | 11/2009 | Ould ............................. | 340/5.2 |

FOREIGN PATENT DOCUMENTS

WO 2007104923 A1 9/2007

* cited by examiner

*Primary Examiner* — Christopher Brown
*Assistant Examiner* — Fahimeh Mohammadi
(74) *Attorney, Agent, or Firm* — Altis Law Group, Inc.

(57) ABSTRACT

A mobile phone anti-theft system includes a mobile phone, a SIM card and a real-name card-issuing system. The real-name card-issuing system includes a central processing unit, a first user information storage area, transmission equipment, and a card reader. The SIM card communicates with the central processing unit through the card reader and the transmission equipment. The real-name card-issuing system sends user information stored in the first user information storage area to the SIM card. If the SIM card needs to change the user information, it should verify first cryptographic keys with the real-name card-issuing system. The mobile phone includes a micro control unit, a second user information storage area and a transmission unit. The SIM card communicates with the micro control unit through the transmission unit. After each startup of the mobile phone, the mobile phone verifies second cryptographic keys with the SIM card.

13 Claims, 7 Drawing Sheets

ANTI-THEFT SYSTEM AND METHOD FOR MOBILE PHONE

BACKGROUND

1. Technical Field

The present disclosure relates to an anti-theft system and method for mobile phone.

2. Description of Related Art

With the development of wireless communication and information processing technology, portable electronic devices, such as mobile phones are now in widespread use.

However, as mobile phones become smaller, the mobile phones may be more easily lost or stolen.

Therefore, there is room for improvement within the art.

BRIEF DESCRIPTION OF THE DRAWINGS

Many aspects of the present anti-theft system and method for mobile phone can be better understood with reference to the following drawings. The components in the various drawings are not necessarily drawn to scale, the emphasis instead being placed upon clearly illustrating the principles of the present anti-theft system and method for mobile phone.

DETAILED DESCRIPTION

Figure 1:
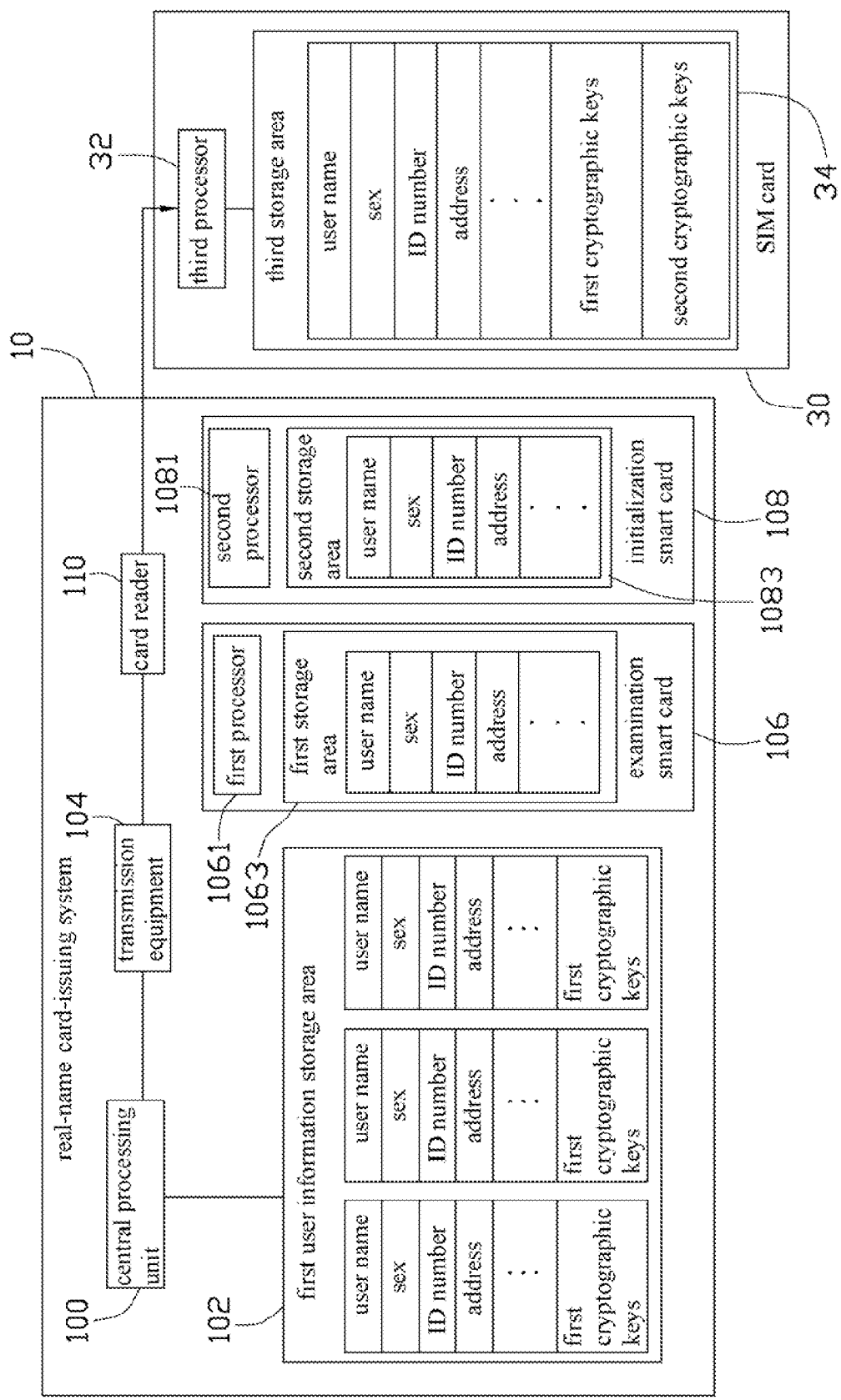
FIG. 1 is a block diagram of a real-name card-issuing system and a SIM card, according to an exemplary embodiment.
Figure 2:
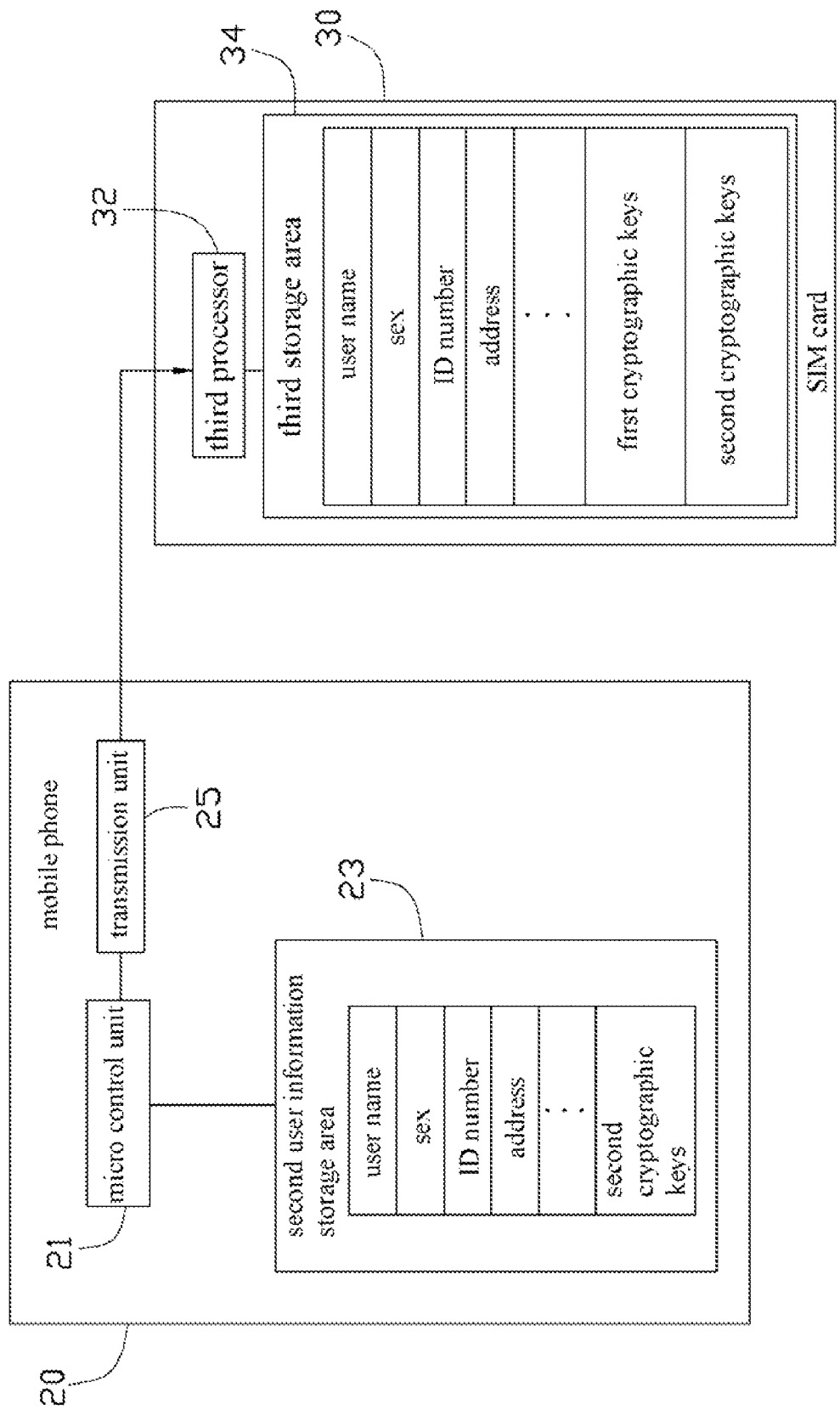
FIG. 2 is a block diagram of a mobile phone and the SIM card shown in FIG. 1, according to the exemplary embodiment.

FIG. 1 and FIG. 2 show a mobile phone anti-theft system according to an exemplary embodiment. The mobile phone anti-theft system includes a real-name card-issuing system 10, a mobile phone 20 and a SIM card 30.

Referring to FIG. 1, the real-name card-issuing system 10 is the information management system of the communication operators, i.e., wireless carriers. The real-name card-issuing system 10 includes a central processing unit 100, a first user information storage area 102, transmission equipment 104, an examination smart card 106, an initialization smart card 108 and a card reader 110. The first user information storage area 102, the central processing unit 100, the transmission equipment 104 and the card reader 110 are electronically connected together. The examination smart card 106, the initialization smart card 108 and the SIM card 30 can communicate with the central processing unit 100 through the card reader 110 and the transmission equipment 104. The transmission equipment 104 reads the information from the card connected to the card reader 110 and sends the information to the central processing unit 100. The card reader 110 should be only connected to one card at a time. The examination smart card 106 includes a first processor 1061 and a first storage area 1063. The initialization smart card 108 includes a second processor 1081 and a second storage area 1083. The SIM card 30 includes a third processor 32 and a third storage area 34. The third storage area 34 stores user information, first cryptographic keys and second cryptographic keys.

Referring also to FIG. 2, the mobile phone 20 includes a micro control unit 21, a second user information storage area 23 and a transmission unit 25. The second user information storage area 23, the micro control unit 21 and the transmission unit 25 are electronically connected together. The transmission unit 25 reads the information from the card inserted into the mobile phone 20 and sends the information to the micro control unit 21. The SIM card 30, the examination smart card 106, and the initialization smart card 108 can communicate with the micro control unit 21 through the transmission unit 25. The examination smart card 106 and the initialization smart card 108 are owned by the communication operators, so when the examination smart card 106 or the initialization smart card 108 is inserted into the mobile phone 20, the mobile phone 20 can be operated normally without verifying the cryptographic keys. When the SIM card 30 is inserted into the mobile phone 20, the second cryptographic keys should be verified before using the mobile phone 20.

Figure 3:
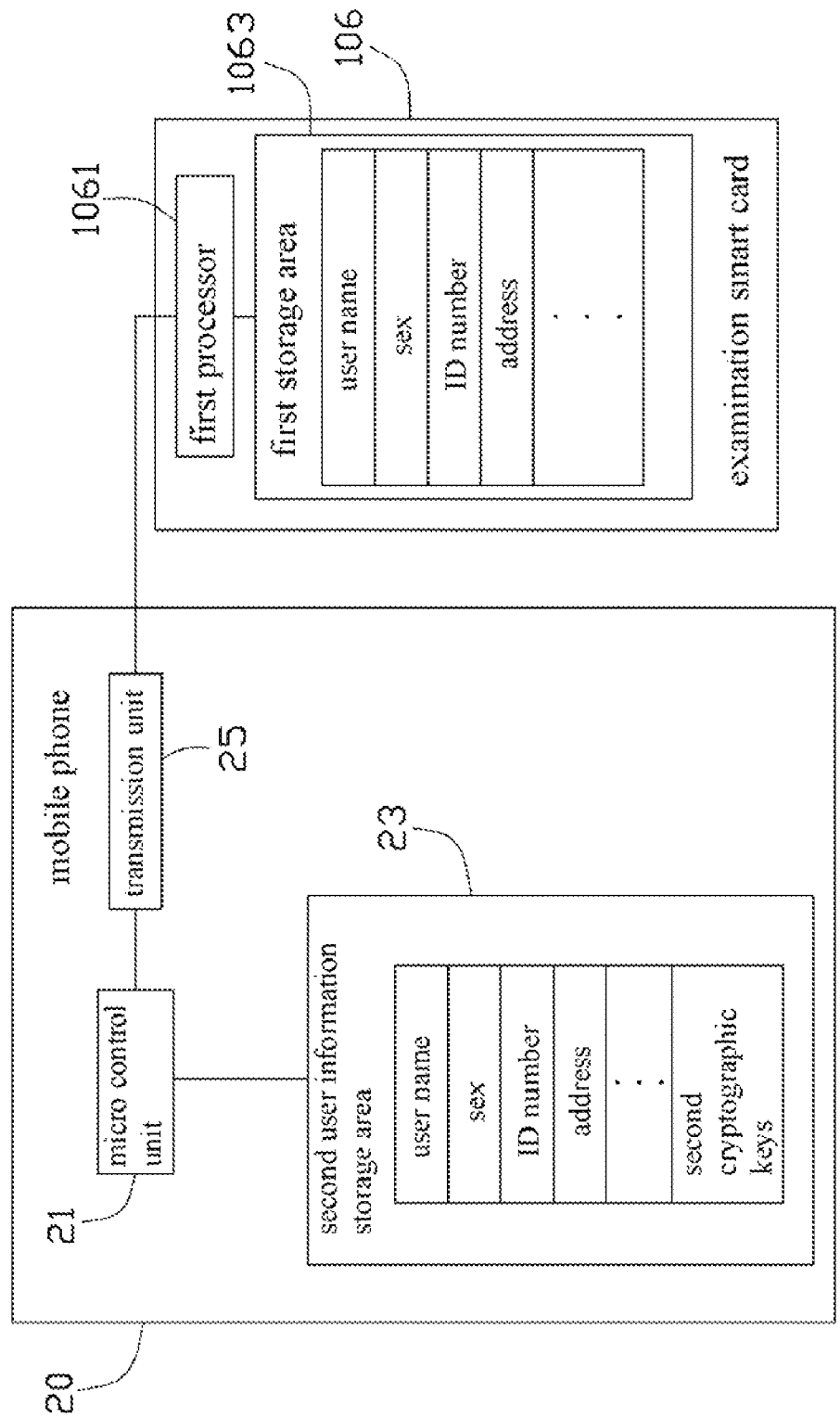
FIG. 3 is a block diagram of the mobile phone and an examination smart card shown in FIGS. 1-2.
Figure 4:
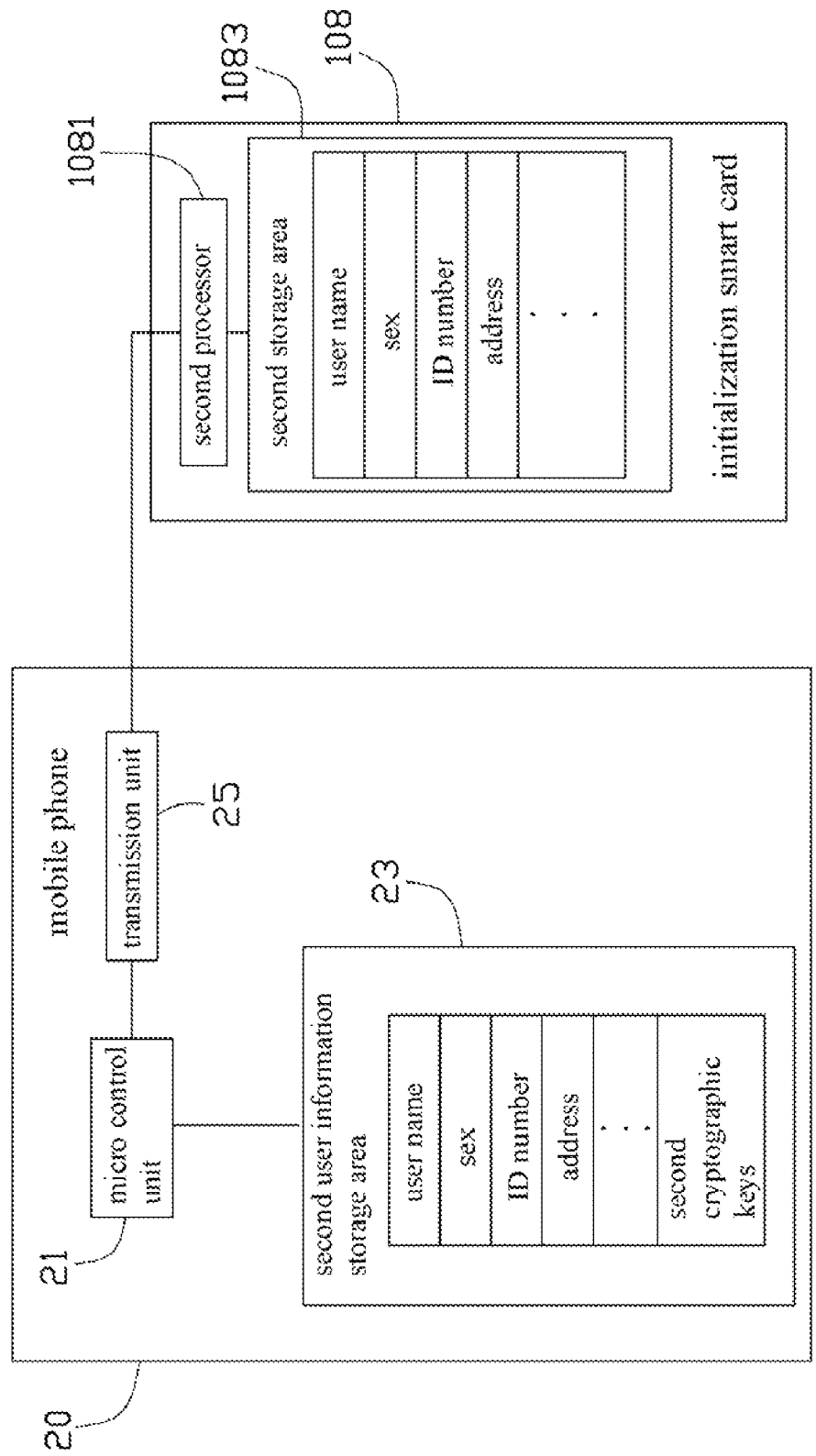
FIG. 4 is a block diagram of the mobile phone and an initialization smart card shown in FIGS. 1-2.
Figure 5:
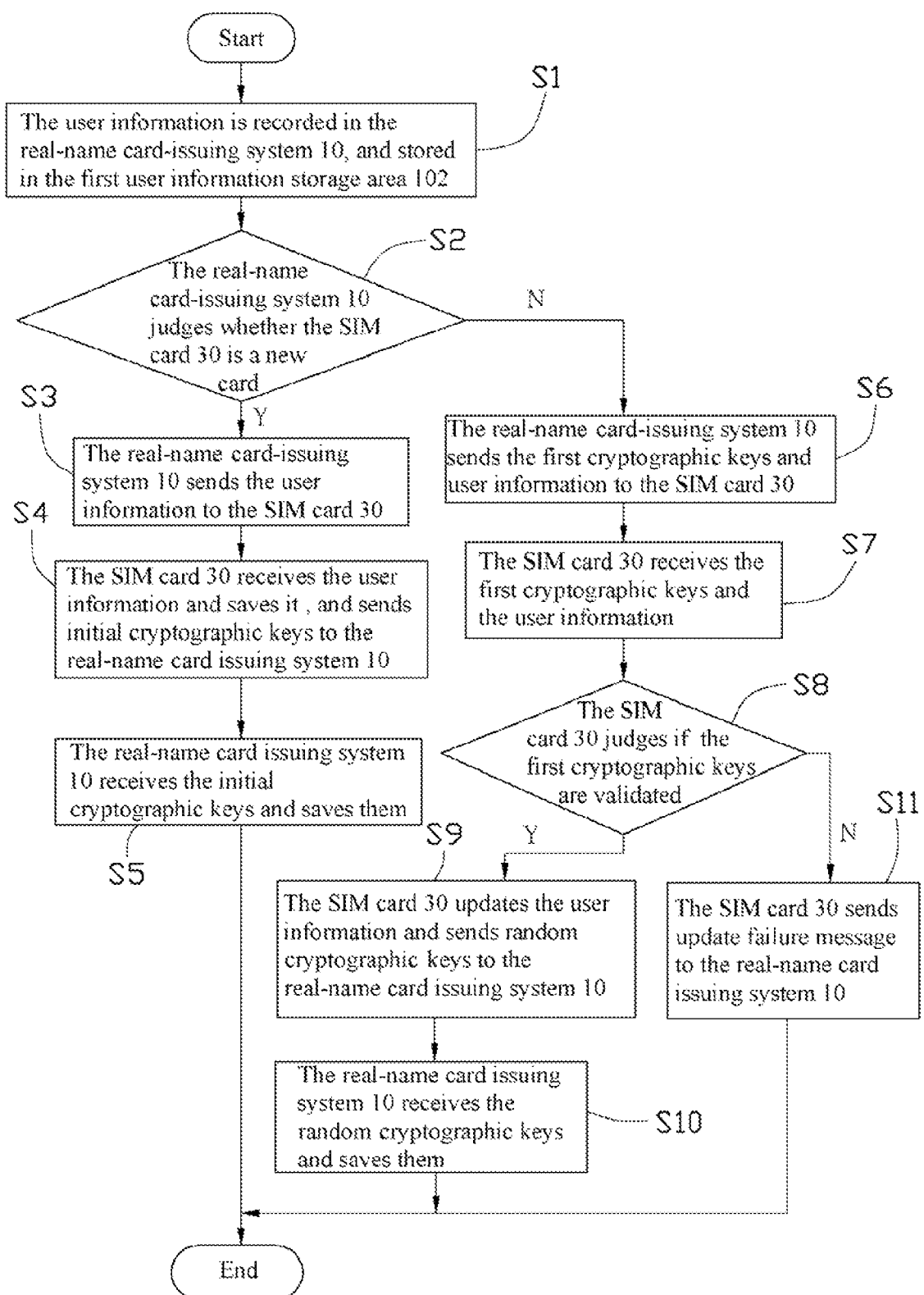
FIG. 5 is a flow chart of the first cryptographic keys setting and verification between the SIM card and the real-name card-issuing system shown in FIG. 1.

Referring to FIG. 3 and FIG. 4, the first processor 1061 and the second processor 1081 can communicate with the micro control unit 21 through the transmission unit 25. Referring to FIG. 5, the SIM card 30 should be registered in the real-name card-issuing system 10 before the initial use. If the user information of the SIM card 30 needs to be changed, first, the real-name card-issuing system 10 should verify the first cryptographic keys of the SIM card 30. The processes of the registering and making changes in the user information of the SIM card 30 may include the following steps:

In step S1, the user information such as user name, sex, ID number, address and so on are inputted into the real-name card-issuing system 10 and saved in the first user information storage area 102.

In step S2, the SIM card 30 is electronically connected to the card reader 110, the card reader 110 reads the information of the SIM card 30 and sends the information to the central processing unit 100. The central processing unit 100 judges whether the SIM card 30 is new. If the SIM card 30 is new, the process goes to step S3, where the real-name card-issuing system 10 sends the user information inputted in step S1 to the SIM card 30. If the SIM card 30 is not new, the process goes to step S6, where the real-name card-issuing system 10 sends the user information inputted in the step S1 and the first cryptographic keys stored in the first user information storage area 102 to the SIM card 30.

In step S4, the third processor 32 receives the user information and saves it in the third storage area 34. The third processor 32 randomly generates initial keys and sends them to the real-name card-issuing system 10.

In step S5, the real-name card-issuing system 10 receives the initial keys as the first cryptographic keys and saves the initial cryptographic keys to the first user information storage area 102. Thus, the registration of the SIM card 30 is completed.

In step S7, the SIM card 30 receives the user information and the first cryptographic keys.

In step S8, the SIM card 30 judges whether the first cryptographic keys are validated. If the first cryptographic keys are validated, the process goes to step S9, where the SIM card 30 updates the user information and sends random cryptographic keys to the real-name card-issuing system 10. If the first cryptographic keys are not validated, the process goes to step S11, where the SIM card 30 sends update failure message to the real-name card-issuing system 10. Thus, the SIM card 30 can not be used.

In step S10, the real-name card-issuing system 10 receives the random cryptographic keys and saves the random cryptographic keys to the first user information storage area 102. Thus, the user information is updated and the first cryptographic keys verification between the real-name card-issuing system 10 and the SIM card 30 is completed.

Figure 6:
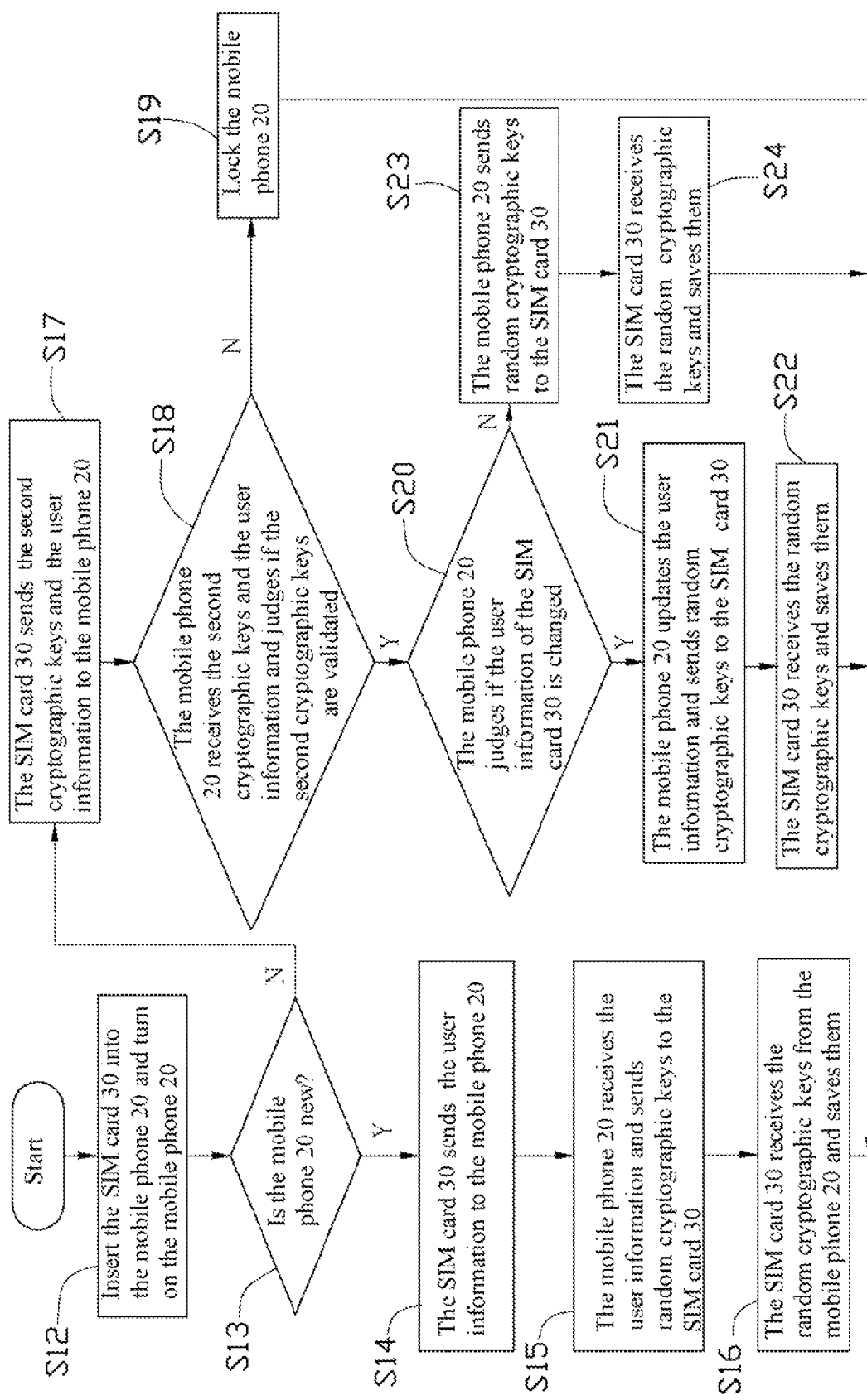
FIG. 6 is a flow chart of the second cryptographic keys setting and verification between the SIM card and the mobile phone shown in FIG. 2.

Referring to FIG. 6, the SIM card 30 should have registered in the real-name card-issuing system 10 before being used in the mobile phone 20. After each startup of the mobile phone 20, the mobile phone 20 verifies the second cryptographic keys of the SIM card 30. The processes of the second cryptographic keys setting and verification between the SIM card 30 and the mobile phone 20 may include the following steps:

In step S12, the SIM card 30 is inserted into the mobile phone 20 and the mobile phone 20 is turned on.

In step S13, the third processor 32 judges whether the mobile phone 20 is new. If the mobile phone 20 is new, the process goes to step S14, where the third processor 32 sends the user information to the micro control unit 21. If the mobile phone 20 is not new, the process goes to step S17, where the third processor 32 sends the user information and the second cryptographic keys to the micro control unit 21.

In step S15, the micro control unit 21 receives the user information and saves it to the second user information storage area 23. The micro control unit 21 randomly generates cryptographic keys and sends them to the third processor 32.

In step S16, the third processor 32 receives the random cryptographic keys as the second cryptographic keys and saves the random cryptographic keys to the third storage area 34. Thus, the second cryptographic keys setting between the SIM card 30 and the mobile phone 20 is completed.

In step S18, the micro control unit 21 receives the user information and the second cryptographic keys and judges whether the second cryptographic keys are validated. If the second cryptographic keys are not validated, the process goes to step S19, where the mobile phone 20 is locked. If the second cryptographic keys are validated, the process goes to step S20, where the micro control unit 21 judges whether the user information is changed according to the user information comparison between the second user information storage area 23 and the third storage area 34.

In step S20, if the user information is changed, the process goes to step S21, where the micro control unit 21 updates the user information and sends random cryptographic keys to the SIM card 30. If the user information is not changed, the process goes to step S23, where the micro control unit 21 randomly generates cryptographic keys and sends them to the third processor 32.

In step S22, the third processor 32 receives the random cryptographic keys and saves the random cryptographic keys to the third storage area 34. Thus, the user information update and the second cryptographic keys verification between the SIM card 30 and the mobile phone 20 is completed.

In step S24, the SIM card 30 receives the random cryptographic keys of the step S23 and saves the random cryptographic keys to the third storage area 34. Thus, the second cryptographic keys verification between the SIM card 30 and the mobile phone 20 is completed.

Figure 7:
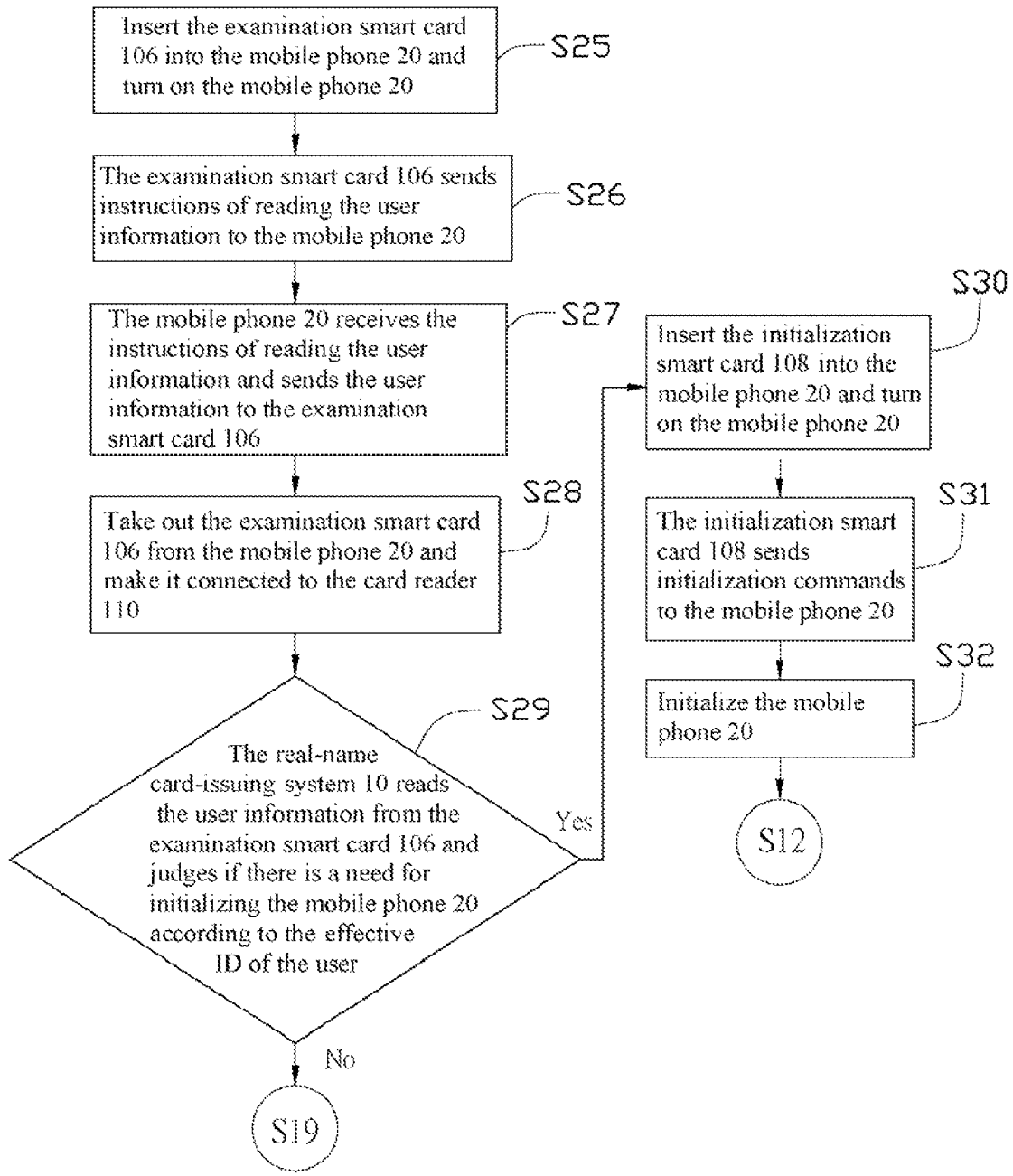
FIG. 7 is a flow chart of initialization of the mobile phone shown in FIG. 2.

Referring to FIG. 7, a flow chart of the mobile phone initialization is shown. If the mobile phone 20 needs to use another new SIM card or another old SIM card, the real-name card-issuing system 10 should initialize the mobile phone 20. The process of the mobile phone initialization may include the following steps:

In step S25, the examination smart card 106 is inserted into the mobile phone 20 and the mobile phone 20 is turned on.

In step S26, the first processor 1061 sends instructions of reading the user information to the micro control unit 21.

In step S27, the micro control unit 21 receives the instructions of reading the user information and sends the user information of the second user information storage area 23 to the first processor 1061. The first processor 1061 receives the user information and saves it to the first storage area 1063.

In step S28, the examination smart card 106 is taken out of the mobile phone 20 and connected to the card reader 110.

In step S29, the central processing unit 100 reads the user information from the examination smart card 106 and judges whether there is a need for initializing the mobile phone 20 according to the effective ID of the user, i.e., valid ID card. If the effective ID of the user corresponds with the user information stored in the examination smart card 106, the process goes to step S30, where the initialization smart card 108 is inserted into the mobile phone 20 and the mobile phone 20 is turned on. If the effective ID of the user does not correspond with the user information stored in the examination smart card 106, the process goes to step S19, where the mobile phone 20 is locked.

In step S31, the second processor 1081 of the initialization smart card 108 sends the initialization commands to the micro control unit 21.

In step S32, the mobile phone 20 is initialized, the process goes to step S12.

According to the first cryptographic keys authentication, the second cryptographic keys authentication and the real-name card-issuing system, the mobile phone can not be used if the SIM card is changed. If the user want to change the SIM card, the effective ID of the user must be shown to the communication operators, and the communication operators makes the real-name card-issuing system to compare the user information with the effective ID. If the effective ID of the user corresponds with the user information, the mobile phone will be initialized, and then the user can change the SIM card.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A mobile phone anti-theft system, comprising:
 a mobile phone including a micro control unit, a second user information storage area and a transmission unit, the second user information storage area, the micro control unit and the transmission unit electronically connected together;
 a SIM card; and
 a real-name card-issuing system including a central processing unit, a first user information storage area, a transmission equipment, a card reader, an examination smart card, and an initialization smart card, the first user information storage area, the central processing unit, the transmission equipment and the card reader electronically connected together, the examination smart card being configured for reading the user information stored in the second user information storage area, the initialization smart card being configured for initializing the mobile phone, the examination smart card and the initialization smart card both communicating with the central processing unit through the card reader and the transmission equipment;

wherein the SIM card communicates with the central processing unit through the card reader and the transmission equipment, the real-name card-issuing system sends user information stored in the first user information storage area to the SIM card, if the SIM card needs to change the user information, the SIM card should verify first cryptographic keys with the real-name card-issuing system; the SIM card communicates with the micro control unit through the transmission unit, and the user information of the SIM card is sent to the mobile phone and stored in the second user information storage area, and after each startup of the mobile phone, the mobile phone verifies the second cryptographic keys with the SIM card.

2. The mobile phone anti-theft system as claimed in claim 1, wherein the examination smart card includes a first processor and a first storage area, the initialization smart card includes a second processor and a second storage area, the first processor and the second processor can communicate with the micro control unit through the transmission unit.

3. The mobile phone anti-theft system as claimed in claim 1, wherein the SIM card includes a third processor and a third storage area for storing user information, the first cryptographic keys and the second cryptographic keys.

4. The mobile phone anti-theft system as claimed in claim 3, wherein the SIM card receives the user information from the real-name card-issuing system and saves it to the third storage area, then the third processor generates random cryptographic keys, saves the random cryptographic keys to the third storage area and sends them to the real-name card-issuing system, the real-name card-issuing system receives the random cryptographic keys as the first cryptographic keys and saves the random cryptographic keys to the first user information storage area.

5. The mobile phone anti-theft system as claimed in claim 4, wherein if the user information of the real-name card-issuing system is changed, the real-name card-issuing system sends the first cryptographic keys stored in the first user information storage area to the SIM card, the SIM card receives the first cryptographic keys and verifies the first cryptographic keys, if the first cryptographic keys are validated, the SIM card updates the user information and sends new random cryptographic keys to the real-name card-issuing system.

6. The mobile phone anti-theft system as claimed in claim 4, wherein when the SIM card is inserted into a new mobile phone, the SIM card sends the user information to the micro control unit, the micro control unit receives the user information, saves it to the second user information storage area and sends random cryptographic keys to the SIM card, the SIM card receives the random cryptographic keys as the second cryptographic keys and saves the random cryptographic keys to the third processor.

7. The mobile phone anti-theft system as claimed in claim 4, wherein when the SIM card is inserted into a previously used mobile phone, the SIM card sends the user information and the second cryptographic keys to the micro control unit, the micro control unit receives the user information and the second cryptographic keys and judges whether the second cryptographic keys are validated; if the second cryptographic keys are validated, the micro control unit judges whether the user information is changed, if the user information is changed, the micro control unit updates the user information; if the second cryptographic keys are not validated, the mobile phone is locked.

8. The mobile phone anti-theft system as claimed in claim 1, wherein if the mobile phone needs to use another new SIM card or another old SIM card, the examination smart card is inserted into the mobile phone and the mobile phone is turned on, the examination smart card reads the user information of the mobile phone and saves it to the first storage area.

9. The mobile phone anti-theft system as claimed in claim 8, wherein the real-name card-issuing system reads the user information stored in the first storage area and judges if there is a need for initializing the mobile phone according to an effective ID of the user; if there is a need for initializing the mobile phone, the initialization smart card is inserted into the mobile phone and the mobile phone is turned on, the initialization smart card sends the initialization commands to the micro control unit and the mobile phone is initialized.

10. A mobile phone anti-theft method comprising:
providing a real-name card-issuing system including a central processing unit, a first user information storage area for storing user information, a transmission equipment, and a card reader;
providing a SIM card including a third storage area for storing the user information;
providing a mobile phone including a second user information storage area for storing user information;
providing an examination smart card for reading the user information of the mobile phone;
providing an initialization smart card for initializing the mobile phone;
setting first cryptographic keys between the real-name card-issuing system and the SIM card;
setting second cryptographic keys between the mobile phone and the SIM card;
when the SIM card needs to change the user information, verifying the first cryptographic keys;
when the first cryptographic keys are validated, updating the user information of the SIM card;
when the first cryptographic keys are not validated, sending update failure message to the real-name card-issuing system;
after each startup of the mobile phone, verifying the second cryptographic keys;
when the second cryptographic keys are validated, allowing the mobile phone to be used normally;
when the second cryptographic keys are not validated, locking the mobile phone.

11. The mobile phone anti-theft method as claimed in claim 10, further comprising inserting the examination smart card into the mobile phone and turning on the mobile phone; saving the user information of the mobile phone to the examination smart card; electronically connecting the examination smart card to the card reader; and the real-name card-issuing system reading the user information from the examination smart card and comparing the user information with an effective ID of the user.

12. The mobile phone anti-theft method as claimed in claim 11, further comprising if the user information corresponds with the effective ID of the user, inserting the initialization smart card into the mobile phone and turning on the mobile phone; and initializing the mobile phone.

13. The mobile phone anti-theft method as claimed in claim 11, further comprising if the user information does not correspond with the effective ID of the user, locking the mobile phone.

* * * * *